(12) United States Patent
Nemoto

(10) Patent No.: US 9,580,074 B2
(45) Date of Patent: Feb. 28, 2017

(54) VEHICLE TRAVEL CONTROL APPARATUS

(71) Applicant: TOYOTA JIDOSHA KABUSHIKI KAISHA, Toyota-shi (JP)

(72) Inventor: Yusuke Nemoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/912,718

(22) PCT Filed: Aug. 5, 2014

(86) PCT No.: PCT/JP2014/071138
§ 371 (c)(1),
(2) Date: Feb. 18, 2016

(87) PCT Pub. No.: WO2015/033741
PCT Pub. Date: Mar. 12, 2015

(65) Prior Publication Data
US 2016/0200319 A1  Jul. 14, 2016

(30) Foreign Application Priority Data
Sep. 3, 2013  (JP) .................................. 2013-182445

(51) Int. Cl.
*B60W 30/16*  (2012.01)
*B60W 10/04*  (2006.01)
*B60W 10/18*  (2012.01)

(52) U.S. Cl.
CPC ............ *B60W 30/16* (2013.01); *B60W 10/04* (2013.01); *B60W 10/18* (2013.01);
(Continued)

(58) Field of Classification Search
CPC ...... B60W 30/16; B60W 10/04; B60W 10/18; B60W 2550/302; B60W 2550/30; B60W 2550/408; B60W 2550/306
See application file for complete search history.

(56) References Cited

U.S. PATENT DOCUMENTS 5,572,449 A * 11/1996 Tang ................. B60K 31/0008
                                                       180/170
6,401,024 B1 * 6/2002 Tange ............... B60K 31/0008
                                                       180/170
(Continued)

FOREIGN PATENT DOCUMENTS

JP            11-13507 A      1/1999
JP         2002-127783    *   5/2002
(Continued)

OTHER PUBLICATIONS

International Search Report and Written Opinion issued Nov. 18, 2014 filed on Aug. 5, 2014.

*Primary Examiner* — Michael J Zanelli
(74) *Attorney, Agent, or Firm* — Oblon, McClelland, Maier & Neustadt, L.L.P.

(57) ABSTRACT

A vehicle travel control apparatus includes a sensor (16) that obtains preceding vehicle information representing a status of a first preceding vehicle; a communication apparatus (18) that obtains preceding vehicle acceleration/deceleration information, which is generated in a second preceding vehicle, via communication with the second preceding vehicle; and a controller (10) that generates a first target value related to a target acceleration/deceleration value of a host vehicle based on the preceding vehicle information and a second target value related to the target acceleration/deceleration value of the host vehicle based on the preceding vehicle acceleration/deceleration information, and controls acceleration/deceleration of the host vehicle based on the generated first and second target values, wherein the controller (10) corrects the preceding vehicle acceleration/deceleration information according to an index value to
(Continued)

generate the second target value, the index value representing an identity between the first and the second preceding vehicles.

5 Claims, 6 Drawing Sheets

(52) U.S. Cl.
CPC ... *B60W 2550/30* (2013.01); *B60W 2550/302* (2013.01); *B60W 2550/306* (2013.01); *B60W 2550/408* (2013.01); *B60W 2710/0605* (2013.01); *B60W 2710/182* (2013.01)

(56) References Cited

U.S. PATENT DOCUMENTS

| | | | |
|---|---|---|---|
| 2013/0060443 A1* | 3/2013 | Shida | B60K 31/0008 701/96 |
| 2013/0131949 A1* | 5/2013 | Shida | B60T 7/00 701/96 |
| 2014/0292545 A1 | 10/2014 | Nemoto | |

FOREIGN PATENT DOCUMENTS

| | | | |
|---|---|---|---|
| JP | 2011-95834 A | 5/2011 | |
| JP | 2013-67303 A | 4/2013 | |
| JP | 2013-140544 A | 7/2013 | |
| WO | WO 2013/014755 A1 | 1/2013 | |

* cited by examiner

VEHICLE TRAVEL CONTROL APPARATUS

TECHNICAL FIELD

The disclosure is related to a vehicle travel control apparatus.

BACKGROUND ART

It is known that acceleration/deceleration of a following vehicle is controlled by concurrently using PID control by a feedback control system based on an inter-vehicle distance difference with a preceding vehicle and control by a feed-forward system according to the acceleration/deceleration adjusting status of the preceding vehicle based on acceleration/deceleration adjusting information obtained via inter-vehicle communication (see Patent Document 1, for example). The acceleration/deceleration adjusting information is accelerator pedal operation information (accelerator position) and brake operation information (brake position). The acceleration/deceleration of the following vehicle is controlled by adding a feed-forward control amount, which corresponds to the accelerator position and the brake position of the preceding vehicle, to a feed-back control amount determined based on the inter-vehicle distance difference.

[Patent Document 1] Japanese Laid-open Patent Publication No. 11-013507

DISCLOSURE OF INVENTION

Problem to be Solved By Invention

Under a practical travel circumstance, there may be a preceding vehicle in a neighboring lane, for example, other than a target preceding vehicle which the host vehicle follows. If the control is performed on information related to the preceding vehicle other than the target preceding vehicle, it is necessary to appropriately stop the control. For example, in the case of Patent Document 1, if such a state occurs in which the preceding vehicle for which the inter-vehicle distance difference is calculated is not the same as the preceding vehicle that supplies the acceleration/deceleration adjusting information, it is necessary to detect the state to stop the control.

Therefore, an object of the disclosure is to provide a vehicle travel control apparatus that can control acceleration/deceleration of a host vehicle considering an identity between preceding vehicles related to respective information items that are used for control.

Means to Solve the Problem

According to one aspect of the disclosure, a vehicle travel control apparatus is provided which includes:

a sensor that obtains preceding vehicle information representing a status of a first preceding vehicle;

a communication apparatus that obtains preceding vehicle acceleration/deceleration information, which is generated in a second preceding vehicle, via communication with the second preceding vehicle; and a controller that generates a first target value related to a target acceleration/deceleration value of a host vehicle based on the preceding vehicle information and a second target value related to the target acceleration/deceleration value of the host vehicle based on the preceding vehicle acceleration/deceleration information, and controls acceleration/deceleration of the host vehicle based on the generated first and second target values, wherein the controller corrects the preceding vehicle acceleration/deceleration information according to an index value to generate the second target value, the index value representing an identity between the first preceding vehicle related to the preceding vehicle information and the second preceding vehicle related to the preceding vehicle acceleration/deceleration information.

Advantage of the Invention

According to the disclosure, a vehicle travel control apparatus is obtained which can control acceleration/deceleration of a host vehicle considering an identity between preceding vehicles related to respective information items that are used for control.

DESCRIPTION OF REFERENCE NUMERALS

10 vehicle control ECU
16 forward radar sensor
18 wireless control ECU
20 wireless communication antenna
100 vehicle travel control apparatus

BEST MODE FOR CARRYING OUT THE INVENTION

In the following, embodiments are described in detail with reference to appended drawings.

Figure 1:
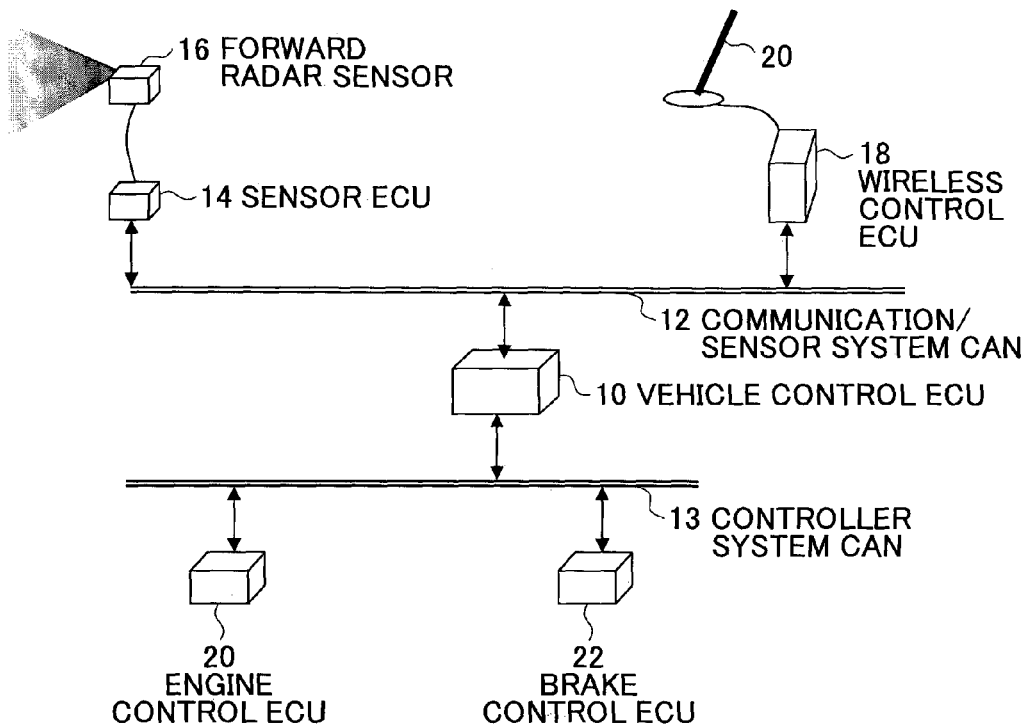
FIG. 1 is a diagram for schematically illustrating a configuration of a vehicle travel control apparatus 100 according to an embodiment.

FIG. 1 is a diagram for schematically illustrating a configuration of a vehicle travel control apparatus 100 according to an embodiment. The vehicle travel control apparatus 100 includes a vehicle control ECU (Electronic Control Unit) 10. The vehicle control ECU 10 may be formed by a processor that includes a CPU. Functions of the vehicle control ECU 10 (including functions described hereinafter) may be implemented by any hardware, any software, any firmware or any combination thereof. For example, any part of or all the functions of the vehicle control ECU 10 may be implemented by an ASIC (application-specific integrated circuit), a FPGA (Field Programmable Gate Array) or a DSP (digital signal processor). Further, the vehicle control ECU 10 may be implemented by a plurality of processors.

The vehicle control ECU 10 is connected to a sensor ECU 14 and a wireless control ECU 18 via an appropriate bus such as a communication/sensor system CAN (controller area network) 12 or the like.

The sensor ECU 14 is connected to a forward radar sensor 16. The sensor ECU 14 controls an operation of the forward radar sensor 16.

The forward radar sensor 16 detects a state (preceding vehicle information) of a preceding vehicle in front of a host vehicle using an electric wave (millimeter wave, for example), a light wave (laser, for example) or a ultrasonic wave as a detection wave. The forward radar sensor 16 detects information which represents a relationship between the preceding vehicle and the host vehicle such as a relative speed, a relative distance and a direction (a lateral position) with respect to the host vehicle, for example, at a predetermined cycle. It is noted that if the forward radar sensor 16 is a millimeter wave radar sensor, the millimeter wave radar sensor may be of an electronic controlled scanning type, for example. In this case, the relative speed of the preceding vehicle is detected using a Doppler frequency (frequency shift) of the electric wave, the relative distance of the preceding vehicle is detected using a delayed time of the reflection wave, and the direction of the preceding vehicle is detected based on a shift difference of the received waves between a plurality of reception antennas. The preceding vehicle information thus obtained is transmitted to the vehicle control ECU 10 at a predetermined cycle. It is noted that any functions of the forward radar sensor 16 (a function of calculating a position of the preceding vehicle, for example) may be implemented by the sensor ECU 14 and the vehicle control ECU 10.

An image sensor may be used in addition to or instead of the forward radar sensor 16. The image sensor includes a camera, which includes imaging elements such as CCDs (charge-coupled device), CMOSs (complementary metal oxide semiconductor), etc., and an image processor to recognize the state of the preceding vehicle. The camera of the image sensor may be of a stereo type. The image sensor detects, based on an image recognition result, the information which represents a relationship between the preceding vehicle and the host vehicle such as a relative speed, and position information of the preceding vehicle with respect to the host vehicle, for example, at a predetermined cycle. The position information of the preceding vehicle includes information related to the position (distance) of the preceding vehicle in the back-and-forth direction of the host vehicle, and information related to the lateral position of the preceding vehicle in the lateral direction (width direction). The lateral position of the preceding vehicle may be calculated based on a center position of a pixel group related to the preceding vehicle in the lateral direction. Alternatively, the lateral position of the preceding vehicle may be calculated as a range between a left end lateral position and a right end lateral position. The preceding vehicle information thus obtained with the image sensor may be transmitted to the vehicle control ECU 10 at a predetermined cycle. It is noted that the image processing function of the image processor (a function of calculating a position of the preceding vehicle, for example) may be implemented by the vehicle control ECU 10.

The wireless control ECU 18 performs inter-vehicle communication with the preceding vehicle via a wireless communication antenna 20. The wireless control ECU 18 obtains preceding vehicle acceleration/deceleration information from the preceding vehicle via the inter-vehicle communication. The preceding vehicle acceleration/deceleration information is initially generated (obtained) in the preceding vehicle. The preceding vehicle acceleration/deceleration information may be arbitrary as long as it is related to the acceleration/deceleration of the preceding vehicle. For example, the preceding vehicle acceleration/deceleration information may be a target value for the acceleration/deceleration of the preceding vehicle, actual acceleration/deceleration value of the preceding vehicle (sensor value) or a combination thereof (filtered value). Further, the preceding vehicle acceleration/deceleration information does not necessarily have a dimension of acceleration (physical amount), and may be arbitrary information related to the acceleration/deceleration of the preceding vehicle such as a target drive force (or a target braking force), a target drive torque (or a target braking torque), position information of the preceding vehicle, speed information of the preceding vehicle, etc. For example, the position information of the preceding vehicle can represent the acceleration of the preceding vehicle by 2-times differentiation. In the following, as an example, it is assumed that the preceding vehicle acceleration/deceleration information is a target value of the acceleration/deceleration of the preceding vehicle (referred to as a "preceding vehicle demand G", hereinafter). The preceding vehicle acceleration/deceleration information thus obtained is transmitted to the vehicle control ECU 10 at a predetermined cycle. The preceding vehicle acceleration/deceleration information may be supplied to the vehicle control ECU 10 after it is subject to pre-processing, etc., at the wireless control ECU 18. It is noted that the function of the wireless control ECU 18 may be implemented by the vehicle control ECU 10.

It is noted that the wireless control ECU 18 may obtain information other than the preceding vehicle acceleration/deceleration information from the preceding vehicle via the inter-vehicle communication. The wireless control ECU 18 may obtain speed information of the preceding vehicle (preceding vehicle speed information) via the inter-vehicle communication. In this case, the preceding vehicle speed information may be obtained concurrently with the preceding vehicle acceleration/deceleration information or separately from the preceding vehicle acceleration/deceleration information. It is noted that, in the former case, the wireless control ECU 18 receives a signal including the preceding vehicle speed information and the preceding vehicle acceleration/deceleration information via the inter-vehicle communication.

The vehicle control ECU 10 is connected to ECUs that control acceleration/deceleration of the host vehicle, that is to say, an engine control ECU 20 and a brake control ECU 22 via an appropriate bus such as a controller system CAN 13, etc. It is noted that in the case of a hybrid vehicle and an electric vehicle, the vehicle control ECU 10 may be connected to an ECU that controls a motor (i.e., an inverter). Further, if a transmission is controlled by an ECU (transmission ECU) other than the engine control ECU 20, the transmission ECU may be connected to the vehicle control ECU 10.

During an ON state of an autonomous drive switch (not illustrated) that is operated by a user, the vehicle control ECU 10 determines, based on the preceding vehicle information from the forward radar sensor 16, host vehicle demand acceleration (referred to as "host vehicle demand G", hereinafter) that is a target acceleration/deceleration for autonomous drive. At that time, the vehicle control ECU 10 calculates, based on the preceding vehicle information from the forward radar sensor 16, a target acceleration/deceleration for feed-back control (referred to as "FB demand G", hereinafter), and calculates, based on the preceding vehicle acceleration/deceleration information obtained via the inter-vehicle communication, a target acceleration/deceleration for feed-forward control (referred to as "FF demand G", hereinafter). The vehicle control ECU 10 determines the host vehicle demand G based on the FB demand G and the FF demand G. It is noted that, in the following, for the sake of convenience, with respect to the host vehicle demand G, the FB demand G, the FF demand G, the preceding vehicle demand G, etc., a positive value represents "acceleration" and a negative value represents "deceleration".

The vehicle control ECU 10 outputs a control target value based on the host vehicle demand G determined such as described above to the engine control ECU 20 and the brake control ECU 22. For example, the vehicle control ECU 10 outputs a target drive force based on the host vehicle demand G to the engine control ECU 20, or outputs a target brake force based on the host vehicle demand G to the brake control ECU 22. The engine control ECU 20 and the brake control ECU 22 control the engine and the brake apparatus such that such a control target value is implemented. For example, the engine control ECU 20 controls a fuel injection amount of the engine and/or a throttle position such that the target drive force is implemented, and the brake ECU 22 controls wheel cylinder pressures of respective wheels such that the target brake force is implemented. It is noted that, in the case of the hybrid vehicle, an output of the motor, in addition to or instead of the output of the engine, may be controlled. Further, in the case of the electric vehicle, the output of the motor, instead of the output of the engine, may be controlled.

A way of calculating the FB demand G is arbitrary. For example, the calculation way used in ACC (Adaptive Cruise Control) or the like may be used. For example, the FB demand G may be determined such that an inter-vehicle time (=inter-vehicle distance/vehicle speed) between the preceding vehicle and the host vehicle becomes a predetermined target inter-vehicle time. In this case, the target inter-vehicle time may be set on a vehicle speed basis (vehicle speed of the host vehicle). Further, the target inter-vehicle time may be varied within a predetermined range set by the user.

It is noted that, in the case of controlling the acceleration/deceleration of the host vehicle based on only the FB demand G (i.e., in the case of an ordinary ACC), the acceleration/deceleration of the host vehicle is implemented in response to an actual increase or decrease of the inter-vehicle time resulting from the acceleration/deceleration of the preceding vehicle. Thus, response of the acceleration/deceleration of the host vehicle to the acceleration/deceleration of the preceding vehicle is not relatively good. On the other hand, in the case of controlling the acceleration/deceleration of the host vehicle using the FF demand G, the acceleration/deceleration of the host vehicle is implemented in response to the generation of the acceleration/deceleration demand in the preceding vehicle. Thus, the response is relatively good. In this way, by controlling the acceleration/deceleration of the host vehicle using the FF demand G, the response of the acceleration/deceleration of the host vehicle to the acceleration/deceleration of the preceding vehicle improves.

The FF demand G is calculated based on the preceding vehicle acceleration/deceleration information (preceding vehicle demand G), etc. The way of calculating the FF demand G is described hereinafter.

Figure 2:
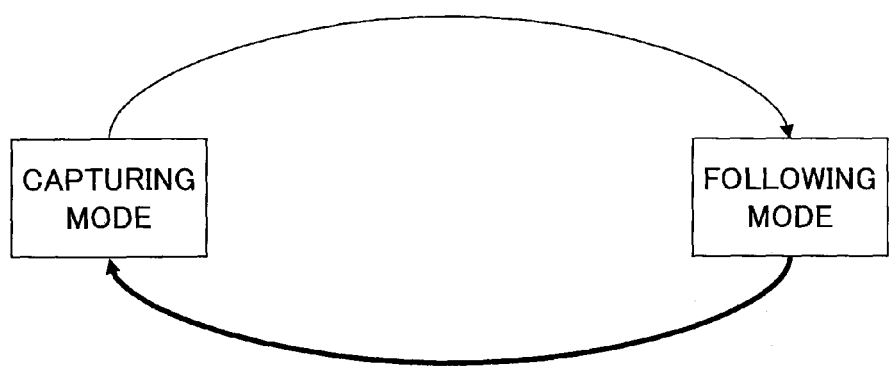
FIG. 2 is a diagram for illustrating an example of a mode transition manner according to a recognition state of a preceding vehicle according to a vehicle control ECU 10.

FIG. 2 is a diagram for illustrating an example of a mode transition manner according to a recognition state of a preceding vehicle according to a vehicle control ECU 10.

The vehicle control ECU 10 operates in a capturing mode or a following mode according to the recognition state of a preceding vehicle.

The capturing mode corresponds to a state in which no preceding vehicle to be followed by the host vehicle is captured. In the capturing mode, the vehicle control ECU 10 performs the process for identifying the preceding vehicle. Typically, the capturing mode is initially formed immediately after the autonomous drive switch is operated by the user to be turned on. Further, the capturing mode is formed in such predetermined cases where another vehicle enters space between the preceding vehicle and the host vehicle, the preceding vehicle moves to the neighboring lane, etc.

The following mode corresponds to a state in which the preceding vehicle to be followed by the host vehicle is captured. In the following mode, the vehicle control ECU 10 controls the acceleration/deceleration of the host vehicle such that the host vehicle follows the preceding vehicle. The following mode may include a mode (referred to as "ACC inter-vehicle control mode", hereinafter) in which the acceleration/deceleration of the host vehicle is controlled based on only the FB demand G, and a mode (referred to as "cooperative ACC inter-vehicle control mode", hereinafter) in which the acceleration/deceleration of the host vehicle is controlled based on the FB demand G and the FF demand G.

Figure 3:
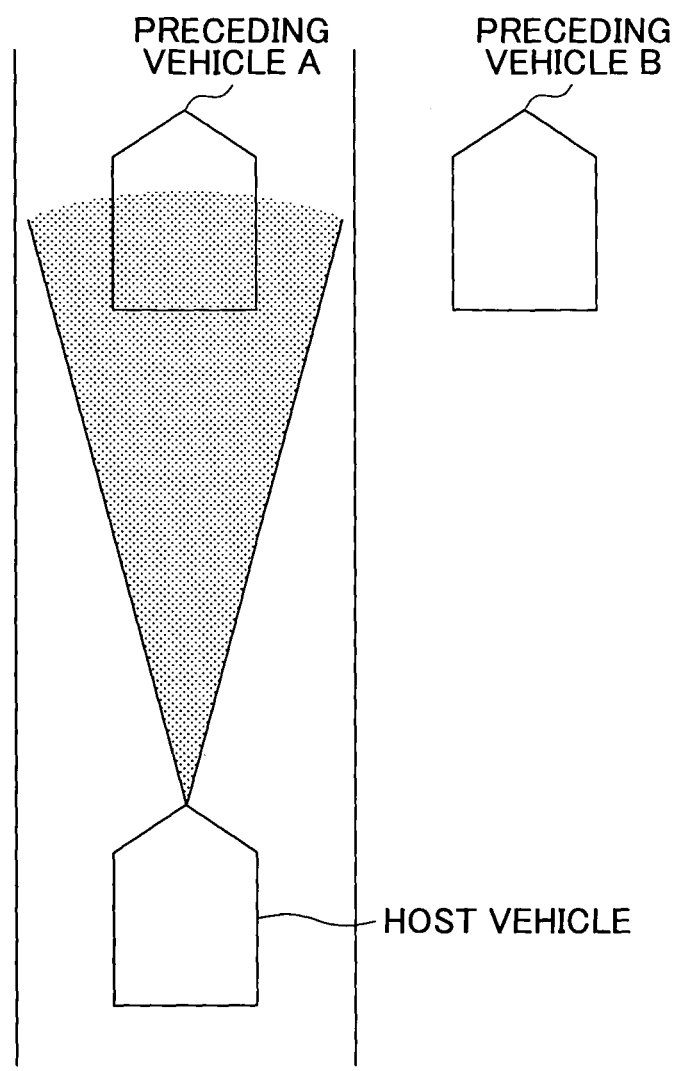
FIG. 3 is a diagram for illustrating an example of a travel scene during a following mode.

FIG. 3 is a diagram for illustrating an example of a travel scene during the following mode. In the example illustrated in FIG. 3, two preceding vehicles (a preceding vehicle A and a preceding vehicle B) travel in front of the host vehicle. The preceding vehicle A travels in the same lane as the host vehicle, while the preceding vehicle B travels in the lane next to the travel lane of the host vehicle.

Here, it is assumed that the vehicle control ECU 10 operates in the cooperative ACC inter-vehicle control mode and the preceding vehicle A is the preceding vehicle to be followed by the host vehicle. In other words, the vehicle control ECU 10 calculates the FB demand G based on the preceding vehicle information related to the preceding vehicle A obtained from the forward radar sensor 16 (whose detection area is schematically illustrated as a hatched area in FIG. 3), and calculates the FF demand G based on the preceding vehicle acceleration/deceleration information obtained via the inter-vehicle communication with the preceding vehicle A. Then, the vehicle control ECU 10 controls the acceleration/deceleration of the host vehicle base on the host vehicle demand G that is determined based on the FB demand G and the FF demand G.

Here, it is assumed that some reasons cause the host vehicle to start the inter-vehicle communication with the preceding vehicle B and thus obtain the preceding vehicle acceleration/deceleration information related to the preceding vehicle B instead of the preceding vehicle acceleration/deceleration information related to the preceding vehicle A. In this case, with only the preceding vehicle acceleration/deceleration information, the vehicle control ECU 10 cannot determine whether the preceding vehicle acceleration/deceleration information is related to the preceding vehicle A or related to another vehicle (i.e., the preceding vehicle B in this example). It is noted that such a circumstance may occur not only during the following mode but also during the capturing mode. In the following, such a circumstance (where the preceding vehicle related to the preceding vehicle information from the forward radar sensor 16 is not the same as the preceding vehicle related to the preceding vehicle information obtained via the inter-vehicle communication) is referred to as a circumstance where "an identity between the preceding vehicles is impaired". In such a circumstance where an identity between the preceding vehicles is impaired, if the cooperative ACC inter-vehicle control mode is continued, the driver may feel that something is wrong. For example, when the preceding vehicle B accelerates at the time of the deceleration, the FF demand G for the acceleration is calculated, which causes the space between the host vehicle and the preceding vehicle A to decrease temporarily and thus causes the driver to feel that something is wrong.

Therefore, according to the embodiment, the vehicle control ECU 10 calculates the FF demand G by correcting the preceding vehicle demand G based on an index value (also referred to as "an identity index value" that represents an identity between the preceding vehicle related to the preceding vehicle information obtained from the forward radar sensor 16 and the preceding vehicle related to the preceding vehicle acceleration/deceleration information. It is noted that the identity index value may be such an index value (a statistic of an error described hereinafter) that increases as a likelihood that the identity between the preceding vehicles is impaired increases. Alternatively, the identity index value may be such an index value that decreases as the likelihood that the identity between the preceding vehicles is impaired increases. Some examples of the identity index value are described hereinafter.

For example, if such an index value is used that decreases as the likelihood that the identity between the preceding vehicles is impaired increases, the preceding vehicle demand G may be corrected as follow. For example, the FF demand G is determined such that a difference with respect to the preceding vehicle demand G becomes greater (i.e., the response of the acceleration/deceleration of the host vehicle to the acceleration/deceleration of the preceding vehicle becomes worse) in a case where the identity index value is less than a predetermined reference value than in a case where the identity index value is greater than the predetermined reference value. For example, if the FF demand G is calculated by (FF demand G)=(preceding vehicle demand G)×Ke, a correction coefficient Ke may be set such that the correction coefficient Ke becomes smaller as the identity index value decreases, such that the correction coefficient Ke is set to "1" when the identity index value is maximum, while the correction coefficient Ke is set to "0" when the identity index value is minimum, for example. With this arrangement, when the identity index value is small, the control of the acceleration/deceleration of the host vehicle can be kept, reducing the response of the acceleration/deceleration (predominantly using the FB demand G). In this case, according to the embodiment, by correcting the preceding vehicle demand G according to the identity index value to calculate the FF demand G, the acceleration/deceleration of the host vehicle can be controlled in an appropriate manner according to the reliability of the preceding vehicle acceleration/deceleration information, etc. Thus, it becomes possible to reduce the likelihood that the driver feels that something is wrong in the circumstance where the identity between the preceding vehicles is impaired.

Figure 4:
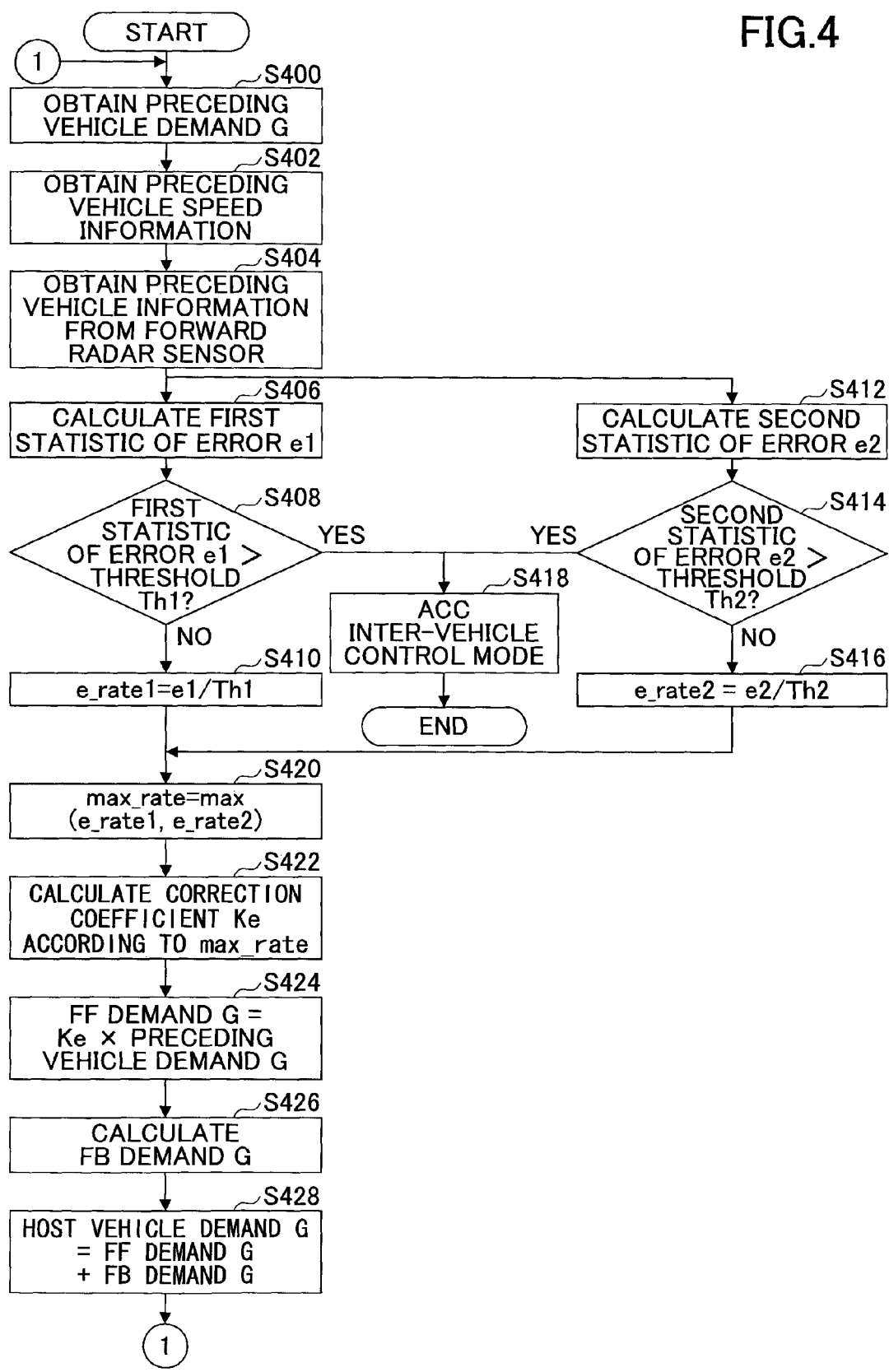
FIG. 4 is a flowchart for illustrating an example of a process performed by the vehicle control ECU 10.

FIG. 4 is a flowchart for illustrating an example of a process performed by the vehicle control ECU 10. The process routine illustrated in FIG. 4 may be performed repeatedly every predetermined cycle during the ON state of the autonomous drive switch and the operation in the cooperative ACC inter-vehicle control mode.

In step S400, the vehicle control ECU 10 obtains the latest preceding vehicle acceleration/deceleration information (preceding vehicle demand G) from the wireless control ECU 18. It is noted that the cycle of the inter-vehicle communication in the wireless control ECU 18 may be arbitrary, but preferably it is as short as the case with the predetermined cycle of the process routine illustrated in FIG. 4.

In step S402, the vehicle control ECU 10 obtains the latest preceding vehicle speed information from the wireless control ECU 18. It is noted that the preceding vehicle speed information may be obtained integrally with the preceding vehicle acceleration/deceleration information. In such a case, the preceding vehicle speed information can be obtained from the same preceding vehicle as the preceding vehicle acceleration/deceleration information with high reliability. Further, the vehicle speed of the preceding vehicle may be calculated based on the preceding vehicle acceleration/deceleration information, instead of obtaining the preceding vehicle speed information. In this case, the current vehicle speed of the preceding vehicle may be calculated by integrating speed change amounts based on the preceding vehicle acceleration/deceleration information from the vehicle speed of the preceding vehicle at predetermined timing. The vehicle speed of the preceding vehicle at predetermined timing may be based on the preceding vehicle information from the forward radar sensor 16 or the vehicle speed of the preceding vehicle (0) at the time of detecting the stoppage.

In step S404, the vehicle control ECU 10 obtains the latest preceding vehicle information from the forward radar sensor 16. Processes of step S406 through step S410 and processes of step S412 through step S416 are executed in parallel when the process of step S404 is completed.

In step S406, the vehicle control ECU 10 calculates a first statistic of an error e1 (an example of the identity index value). The first statistic of an error e1 may be calculated by the following formula, for example.

$$e1 = \frac{\Sigma |V_{rd} - V_{com}|^2}{n}$$

Here, Vrd represents the vehicle speed of the preceding vehicle based on the preceding vehicle information from the forward radar sensor 16, and Vcom represents the vehicle speed of the preceding vehicle based on the preceding vehicle speed information (i.e., the vehicle speed of the preceding vehicle based on the information obtained via the inter-vehicle communication). n is the number of samples. In this case, the first statistic of an error e1 is calculated based on n speed data groups (Vrd, Vcom) within the latest predetermined time period. It is noted that, preferably, (Vrd, Vcom) of each speed data group are obtained at the same time. For this purpose, preferably, the sampling cycle of the preceding vehicle from the forward radar sensor 16 and the cycle of the inter-vehicle communication are synchronized. It is noted that Vrd may be calculated by adding the vehicle speed of the host vehicle (information from vehicle speed sensors, for example) to the relative speed based on the preceding vehicle information from the forward radar sensor 16. The vehicle speed of the host vehicle may be calculated based on the positions of the host vehicle measured by a GPS (Global Positioning System) receiver, or may be calculated based on the detection values of rpms of an output shaft of the transmission.

In step S408, the vehicle control ECU 10 determines whether the first statistic of an error e1 exceeds a predetermined threshold Th1. The predetermined threshold Th1 corresponds to the minimum value or the maximum value of a possible range within which the first statistic of an error e1 may vary when the preceding vehicle related to the preceding vehicle information from the forward radar sensor 16 and the preceding vehicle related to the preceding vehicle speed information obtained via the inter-vehicle communication are the same, for example. The predetermined threshold Th1 may be adapted based on experimental results, etc. It is noted that, when the preceding vehicle related to the preceding vehicle information from the forward radar sensor 16 is the same as the preceding vehicle related to the preceding vehicle speed information obtained via the inter-vehicle communication, the difference between these two speeds (Vrd, Vcom) is always supposed to be small under a normal situation, and thus the first statistic of an error e1 is supposed to be small. If the first statistic of an error e1 exceeds the predetermined threshold Th1, the process goes to step S418, and otherwise the process goes to step S410.

In step S410, the vehicle control ECU 10 calculates a ratio e_rate1(=e1/Th1) of the first statistic of an error e1 to the predetermined threshold Th1.

In step S412, the vehicle control ECU 10 calculates a second statistic of an error e2. The second statistic of an error e2 may be calculated by the following formula, for example.

$$e2 = \frac{\Delta V_{rd} - \Delta V_{com}}{|\max(\Delta V_{rd}, \Delta V_{com})|}$$

Here, $\Delta Vrd$ represents a differential between Vrd at present and Vrd before a predetermined time (about 1 sec, for example), and $\Delta Vcom$ represents a differential between Vcom at present and Vcom before the same predetermined time.

In step S414, the vehicle control ECU 10 determines whether the second statistic of an error e2 exceeds a predetermined threshold Th2. The predetermined threshold Th2 corresponds to the minimum value or the maximum value of a possible range within which the second statistic of an error e2 may vary when the preceding vehicle related to the preceding vehicle information from the forward radar sensor 16 and the preceding vehicle related to the preceding vehicle speed information obtained via the inter-vehicle communication are the same, for example. The predetermined threshold Th2 may be adapted based on experimental results, etc. It is noted that, when the preceding vehicle related to the preceding vehicle information from the forward radar sensor 16 is the same as the preceding vehicle related to the preceding vehicle speed information obtained via the inter-vehicle communication, the difference between these two speeds (Vrd, Vcom) is always supposed to be small under a normal situation, and thus the second statistic of an error e2 is supposed to be small. If the second statistic of an error e2 exceeds the predetermined threshold Th2, the process goes to step S418, and otherwise the process goes to step S416.

In step S416, the vehicle control ECU 10 calculates a ratio e_rate2 (=e2/Th2) of the second statistic of an error e2 to the predetermined threshold Th2. When the processes of step S410 and step S416 are terminated, the process routine goes to step 420.

In step S418, the vehicle control ECU 10 changes the mode from the cooperative ACC inter-vehicle control mode (i.e., the mode in which the acceleration/deceleration is controlled based on the FB demand G and the FF demand G) to the ACC inter-vehicle control mode (i.e., the mode in which the acceleration/deceleration is controlled based on only the FB demand G). In this case, the process routine illustrated in FIG. 4 ends, and then the process routine starts from the process of step S400 when the mode transition to the cooperative ACC inter-vehicle control mode is performed afterward.

In step 420, the vehicle control ECU 10 selects the greater of the ratio e_rate1 calculated in step S410 and the ratio e_rate2 calculated in step S416 as a max_rate(=max (e_rate1, e_rate2).

In step S422, the vehicle control ECU 10 calculates the correction coefficient Ke according to the max_rate (an example of the identity index value) selected in step S420. In this case, the correction coefficient Ke may be set such that the correction coefficient Ke becomes closer to 1 as max_rate decreases, such that the correction coefficient Ke is set to "1" when max_rate is minimum, while the correction coefficient Ke is set to "0" when max_rate is maximum (see FIG. 5).

In step S424, the vehicle control ECU 10 calculates the FF demand G based on the preceding vehicle demand G obtained in step S400 and the correction coefficient Ke determined in step S 422, using the following formula, for example. FF demand G=preceding vehicle demand G×correction coefficient Ke.

In other words, the FF demand G is calculated by multiplying the preceding vehicle demand G by the correction coefficient Ke.

In step S426, the vehicle control ECU 10 calculates the FB demand G based on the information related to the inter-vehicle distance, etc., with respect to the preceding vehicle. As described above, the information related to the inter-vehicle distance is included in the preceding vehicle information from the forward radar sensor 16.

In step S428, the vehicle control ECU 10 calculates the host vehicle demand G based on the FF demand G calculated in step S424 and the FB demand G calculated in step S426. At that time, the host vehicle demand G may be calculated using the following formula, for example.

(host vehicle demand G)=(FF demand G)+(FB demand G)

In other words, the host vehicle demand G is calculated by summing the FF demand G and the FB demand G. When the host vehicle demand G is thus calculated, the acceleration/deceleration of the host vehicle is controlled such that the host vehicle demand G is implemented. When the process of step S428 is terminated, the process routine starts from the process of step S400 at the next process cycle.

According to the process illustrated in FIG. 4, the FF demand G is calculated by multiplying the preceding vehicle demand G by the correction coefficient Ke according to the identity index value, which enables controlling the acceleration/deceleration of the host vehicle in an appropriate manner according to the reliability of the preceding vehicle acceleration/deceleration information, etc.

In this connection, according to a comparative configuration in which the preceding vehicle demand G is directly used as the FF demand G, the influence of the acceleration/deceleration of the preceding vehicle on the preceding vehicle demand G is great because the preceding vehicle demand G is used as it is. Thus, according to the comparative configuration, if the identity between the preceding vehicles is impaired, the driver may feel greatly that something is wrong.

In contrast, according to the process illustrated in FIG. 4, the FF demand G is calculated such that the FF demand G is closer to 0 as max_rate increases, which enables reducing the strange feeling of the driver in the case where the identity between the preceding vehicles is impaired. Further, according to the process illustrated in FIG. 4, because the strange feeling of the driver in the case where the identity between the preceding vehicles is impaired can be reduced, it is possible to set the predetermined thresholds Th1 and Th2 such that they are relatively great. With this arrangement, inconvenience that would occur in the case of setting the relatively small predetermined thresholds Th1 and Th2 can be reduced. The inconvenience includes such a situation where the mode transition from the cooperative ACC inter-vehicle control mode to the ACC inter-vehicle control mode occurs in the case where the identity between the preceding vehicles is not actually impaired, and the mode transition between these modes occurs frequently.

It is noted that, according to the process illustrated in FIG. 4, two statistics of an error e1 and e2 are used; however, only any one of them may be used, or three or more statistics of an error may be used by adding other statistic(s) of an error. Further, other statistic(s) of an error may be used instead of any one of the statistics of an error e1 and e2 or both of the statistics of an error e1 and e2. Other statistic(s) may be arbitrary and may be a correlation coefficient between Vrd and Vcom, for example.

Figure 5:
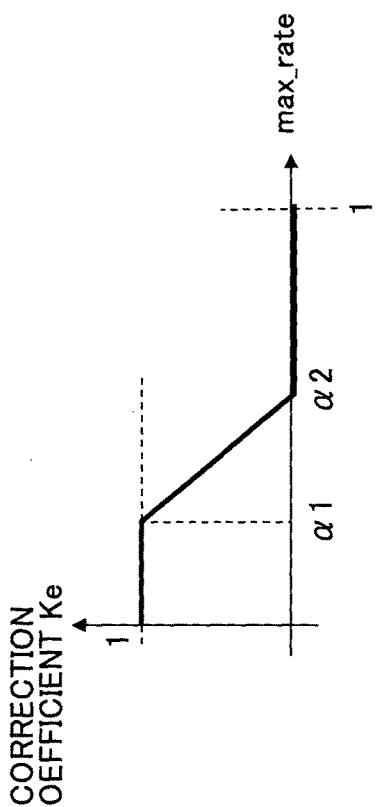
FIG. 5 is a diagram for illustrating an example of a way of determining a correction coefficient Ke according to max_rate (an example of an identity index value).

FIG. 5 is a diagram for illustrating an example of a way of determining the correction coefficient Ke according to max_rate (an example of the identity index value). It is noted that the relationship between max_rate and the correction coefficient Ke illustrated in FIG. 5 may be stored in a form of a lookup table and may be used in the process of step S422 illustrated in FIG. 4.

In the example illustrated in FIG. 5, when max_rate is less than or equal to a predetermined value α1, the correction coefficient Ke is 1. When max_rate exceeds the predetermined value α1, the correction coefficient Ke gradually decreases, and when max_rate is greater than or equal to a predetermined value α2, the correction coefficient Ke becomes 0. It is noted that the example illustrated in FIG. 5 is just an example, and various changes may be made. For example, a section in which the correction coefficient Ke is 0 may include a section in which the correction coefficient Ke is slightly greater than 0. Similarly, a section in which the correction coefficient Ke is 1 may include a section in which the correction coefficient Ke is slightly smaller than 1. Further, in the example illustrated in FIG. 5, when max_rate exceeds the predetermined value α1, the correction coefficient Ke linearly decreases; however, the correction coefficient Ke may non-linearly decrease.

It is noted that, in the case where the lookup table illustrated in FIG. 5 is used in the process illustrated in FIG. 4, the host vehicle demand G is equal to the FB demand G when the correction coefficient Ke becomes 0, which leads to a state where the host vehicle demand G itself is equal to the host vehicle demand G in the ACC inter-vehicle control mode. However, even in this case, the cooperative ACC inter-vehicle control mode is kept. However, in the example illustrated in FIG. 5, the predetermined value α2 may be 1.

Figure 6:
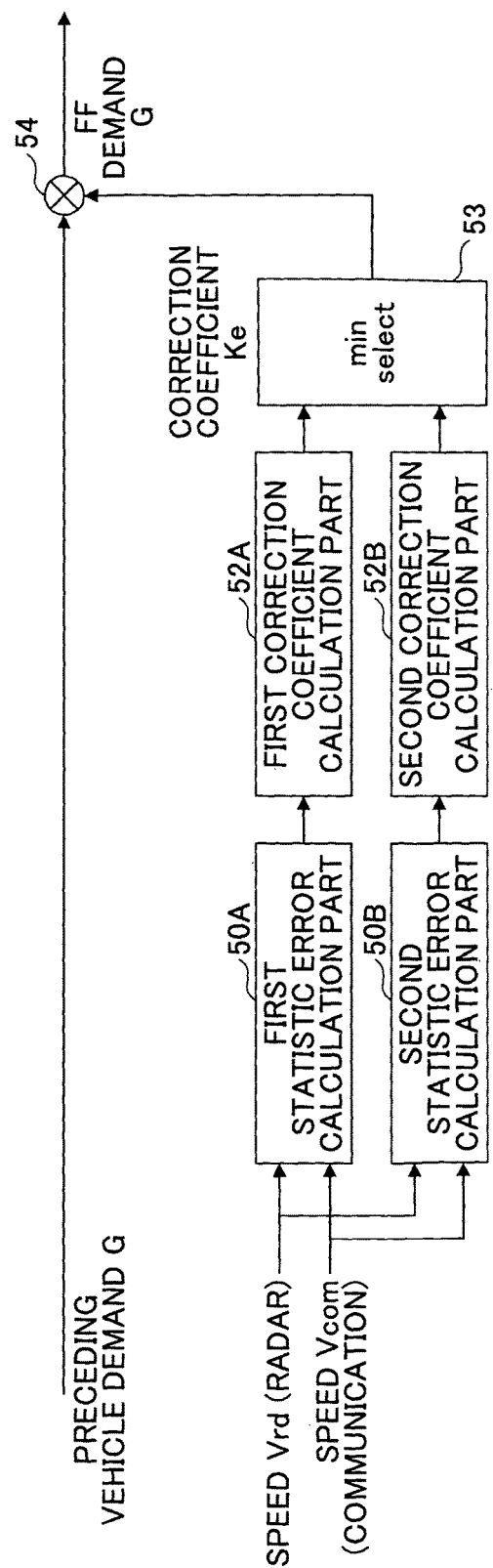
FIG. 6 is a flowchart for illustrating an example of a calculation block in the vehicle control ECU 10.

FIG. 6 is a flowchart for illustrating an example of a calculation block in the vehicle control ECU 10. It is noted that a calculation block illustrated in FIG. 6 is an example of a configuration that implements substantially the same function as the process illustrated in FIG. 4.

In the example illustrated in FIG. 6, the vehicle speed Vrd from the forward radar sensor 16 and the vehicle speed Vcom by the inter-vehicle communication are input to a first statistic error calculation part 50A and a second statistic error calculation part 50B. In the first statistic error calculation part 50A, the first statistic of an error e1 is calculated as explained with respect to step S406 in FIG. 4. In the first statistic error calculation part 50A, the first statistic of an error e1 is calculated as explained with respect to step S406 in FIG. 4.

In a first correction coefficient calculation part 52A, a first correction coefficient is calculated based on the first statistic of an error e1. The first correction coefficient corresponds to the ratio e_rate1(=e1/Th1) as explained with respect to step S410 in FIG. 4. The first correction coefficient may be calculated based on the lookup table illustrated in FIG. 5, for example. Similarly, in a second correction coefficient calculation part 52B, a second correction coefficient is calculated based on the second statistic of an error e2. The second correction coefficient corresponds to the ratio e_rate2 (=e2/Th2) as explained with respect to step S416 in FIG. 4. The second correction coefficient may be calculated based on the lookup table illustrated in FIG. 5, for example. The smaller of the first and second correction coefficients thus calculated is selected as the correction coefficient Ke at a block (a minimum selector) 53, and then is subject to the multiplication at a block (a multiplier) 54 to be the FF demand G.

Figure 7:
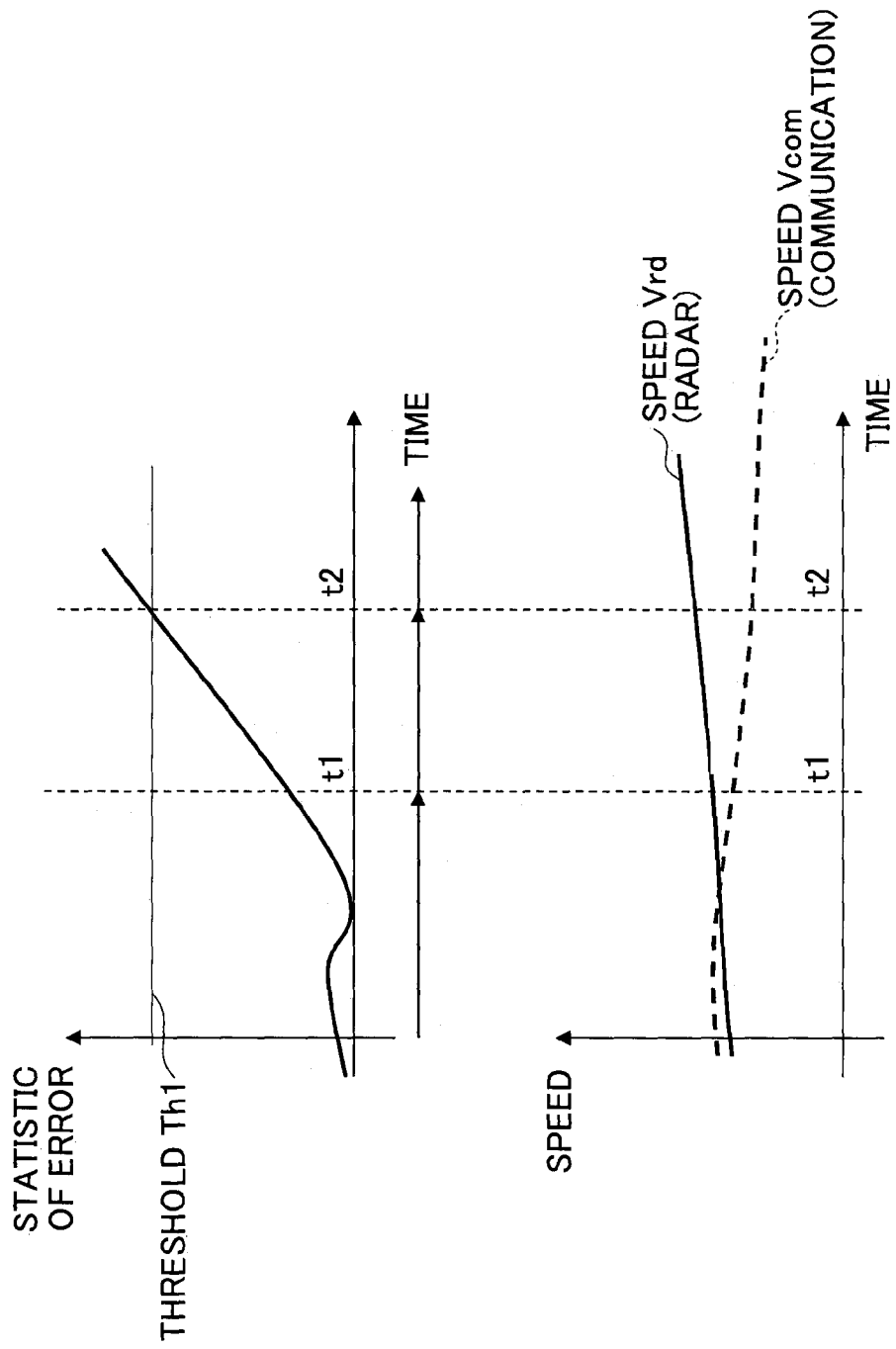
FIG. 7 is a diagram for illustrating an example of a relationship between a time series of a statistic of an error and a transition manner of a control state.

FIG. 7 is a diagram for schematically illustrating an example of a relationship between a time series of the statistic of an error and a transition manner of a control state. Here, as an example, a case is explained where only the first statistic of an error e1 is used. In FIG. 7, the time series of the statistic of an error (first statistic of the error e1) is illustrated at an upper side, and the time series of the vehicle speed Vrd from the forward radar sensor 16 and the time series of the vehicle speed Vcom by the inter-vehicle communication are illustrated at a lower side.

In the example illustrated in FIG. 7, before time t1, the vehicle speed Vrd and the vehicle speed Vcom are substantially the same, and thus the statistic of an error is small. For example, the ratio e_rate1(=e1/Th1) is smaller than the the predetermined value α1 (see FIG. 5). In this case, the correction coefficient Ke is "1", the preceding vehicle demand G is not substantially corrected and thus used as it is as the FF demand G. After that, the difference between the vehicle speed Vrd and the vehicle speed Vcom gradually increases, and thus the statistic of an error gradually increases correspondingly. At the time t1, for example, the ratio e_rate1(=e1/Th1) becomes greater than the predetermined value α1 (see FIG. 5), which causes starting the correction of the preceding vehicle demand G. After that, the difference between the vehicle speed Vrd and the vehicle speed Vcom further increases, and thus the statistic of an error increases correspondingly. At the time t2, the first statistic of the error e1 exceeds the predetermined threshold Th1, and the mode is changed from the cooperative ACC inter-vehicle control mode (i.e., the mode in which the acceleration/deceleration is controlled based on the FB demand G and the FF demand G) to the ACC inter-vehicle control mode (i.e., the mode in which the acceleration/deceleration is controlled based on only the FB demand G).

Figure 8:
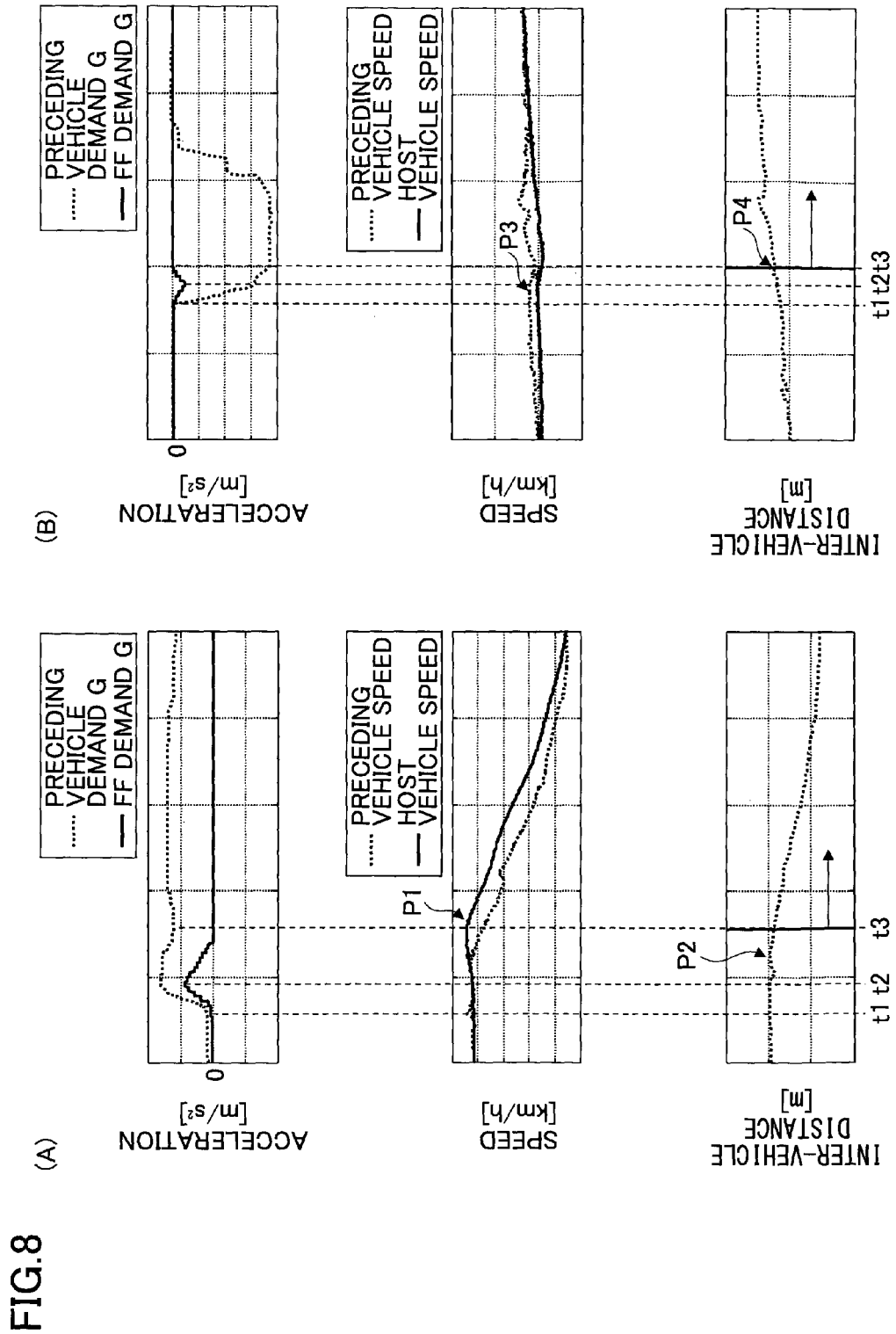
FIG. 8 is a graph for illustrating a simulation result at the time of the transition of the control state such as illustrated in FIG. 7.

FIG. 8 is a graph for illustrating a simulation result at the time of the transition of the control state such as illustrated in FIG. 7. In FIG. 8, (A) illustrates a behavior when the preceding vehicle demand G for the acceleration is given in a situation where the preceding vehicle decelerates, and (B) illustrates a behavior when the preceding vehicle demand G for the deceleration is given in a situation where the preceding vehicle travels at a constant speed (in a high-speed range). With respect to (A) and (B), by changing the preceding vehicle demand G to different values such that the preceding vehicle demand G is not adapted to the motion of the preceding vehicle, the circumstance where an identity between the preceding vehicles is impaired is formed. With respect to (A) and (B), a wave shape of the acceleration (preceding vehicle demand G by dotted lines, and FF demand G by solid line), a wave shape of the speed (preceding vehicle speed by dotted lines, and host vehicle speed by solid line), and a wave shape of the inter-vehicle distance is illustrated from the upper side in this order.

In the example illustrated in FIG. 8(A), the preceding vehicle demand G increases rapidly around the time t1, which causes the FF demand G to increase. However, the correction of the preceding vehicle demand G (suppression against the increase of the FF demand G) is started when the statistic of an error exceeds the predetermined value around the time t2. After that, when the statistic of an error exceeds the threshold around the time t3, the transition from the cooperative ACC inter-vehicle control mode to the ACC inter-vehicle control mode is implemented. In the example illustrated in FIG. 8(A), because the increase of the statistic of an error causes the preceding vehicle demand G to be corrected to calculate the FF demand G, the acceleration is very small around the time of the transition from the cooperative ACC inter-vehicle control mode to the ACC inter-vehicle control mode, as illustrated by the wave shape around P1 in FIG. 8(A), and the variation in the inter-vehicle distance is also very small, as illustrated by the wave shape around P2 in FIG. 8(A).

In the example illustrated in FIG. 8(B), the preceding vehicle demand G increases rapidly around the time t1, which causes the FF demand G to increase. However, the correction of the preceding vehicle demand G (suppression against the increase of the FF demand G) is started when the statistic of an error exceeds the predetermined value around the time t2. After that, when the statistic of an error exceeds the threshold at the time t3, the transition from the cooperative ACC inter-vehicle control mode to the ACC inter-vehicle control mode is implemented. In the example illustrated in FIG. 8(B), because the increase of the statistic of an error causes the preceding vehicle demand G to be corrected to calculate the FF demand G, the deceleration is very small around the time of the transition from the cooperative ACC inter-vehicle control mode to the ACC inter-vehicle control mode, as illustrated by the wave shape around P3 in FIG. 8(B), and the variation in the inter-vehicle distance is also very small, as illustrated by the wave shape around P4 in FIG. 8(B).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiment described above, the identity index value (the statistic of an error) is calculated based on the relationship between the speeds (i.e., the vehicle speed Vrd and the vehicle speed Vcom); however, other parameters may be used. For example, the identity index value may be calculated from a relationship between the relative speeds (the relative speed from the forward radar sensor 16 and the relative speed calculated from the preceding vehicle information, for example), or a relationship between the accelerations (the acceleration obtained from an acceleration sensor of the host vehicle or calculated from the speed information and the acceleration from the preceding vehicle acceleration/deceleration information, for example). Further, the identity index value may be calculated from a relationship between a curvature radius of a road in front of the host vehicle in the traveling direction, which can be obtained from a white line recognition camera (or a curvature radius of a road a predetermined distance ahead of the host vehicle, which can be obtained from a navigation apparatus) and a steering angle of the preceding vehicle obtained via the communication with the preceding vehicle., Further, in the embodiment described above, the FF demand G is calculated by multiplying the preceding vehicle demand G by the correction coefficient Ke; however, the FF demand G may be calculated by correcting the preceding vehicle demand G in other manners. For example, the preceding vehicle demand G may be corrected according to the acceleration/deceleration state of the preceding vehicle, the inter-vehicle distance or the inter-vehicle time with respect to the preceding vehicle, the vehicle speed of the host vehicle, etc., and the FF demand G may be calculated by multiplying the corrected preceding vehicle demand G by the correction coefficient Ke. Further, from the similar viewpoint, the FF demand G may be obtained by calculating a control value (intermediate value) for the feed-forward control from the preceding vehicle demand G, and correcting the control value with the correction coefficient Ke. In any cases, as a result, it can be said that the preceding vehicle information is corrected to obtain the FF demand G.

Further, in the embodiment described above, as an example, the case is assumed where the preceding vehicle acceleration/deceleration information is the preceding vehicle demand G; however, the preceding vehicle acceleration/deceleration information may be any information related to the acceleration/deceleration of the preceding vehicle, as described above. For example, the preceding vehicle acceleration/deceleration information may be the throttle position and the brake position of the preceding vehicle. In this case, in the host vehicle, the preceding vehicle demand G may be calculated (estimated) from the throttle position and the brake position, and the calculated preceding vehicle demand G may be used similarly. Alternatively, the throttle position and the brake position may be corrected to be converted to the preceding vehicle demand G. In this case, the obtained preceding vehicle demand G may be used as it is as the FF demand G. Further, the preceding vehicle acceleration/deceleration information may be a combination (filtered value) of the preceding vehicle demand G and the actual acceleration/deceleration of the preceding vehicle, as described above. In this case, the combining process may be performed in the preceding vehicle or in the host vehicle (by the vehicle control ECU 10, for example).

The present application is based on Japanese Priority Application No. 2013-182445, filed on Sep. 3, 2013, the entire contents of which are hereby incorporated by reference.

The invention claimed is:

1. A vehicle travel control apparatus, comprising:
a sensor that obtains preceding vehicle information representing a status of a first preceding vehicle;
a communication apparatus that obtains preceding vehicle acceleration/deceleration information, which is generated in a second preceding vehicle, via communication with the second preceding vehicle; and
a controller that generates a first target value related to a target acceleration/deceleration value of a host vehicle based on the preceding vehicle information and a second target value related to the target acceleration/deceleration value of the host vehicle based on the preceding vehicle acceleration/deceleration information, and controls acceleration/deceleration of the host vehicle based on the generated first and second target values, wherein
the controller corrects the preceding vehicle acceleration/deceleration information according to an index value to generate the second target value, the index value representing an identity between the first preceding vehicle related to the preceding vehicle information and the second preceding vehicle related to the preceding vehicle acceleration/deceleration information.

2. The vehicle travel control apparatus of claim 1, wherein the index value is calculated based on a time sequential relationship between information obtained from the second preceding vehicle with the communication apparatus and information obtained within the host vehicle.

3. The vehicle travel control apparatus of claim 2, wherein the communication apparatus further obtains preceding vehicle speed information related to a vehicle speed of the second preceding vehicle via the communication, the preceding vehicle speed information being obtained from the second preceding vehicle from which the preceding vehicle acceleration/deceleration information is obtained, and
the index value is calculated based on a time sequential relationship between the vehicle speed of the second preceding vehicle related to the preceding vehicle speed information and the vehicle speed of the first preceding vehicle related to the preceding vehicle information.

4. The vehicle travel control apparatus of claim 3, wherein the index value is a statistic of an error between the vehicle speed of the second preceding vehicle related to the preceding vehicle speed information and the vehicle speed of the first preceding vehicle related to the preceding vehicle information.

5. The vehicle travel control apparatus of claim 4, wherein the controller controls the acceleration/deceleration of the host vehicle based on only the first target value when the statistic of an error exceeds a predetermined threshold, and
the controller controls the acceleration/deceleration of the host vehicle based on the first and second target values when the statistic of an error does not exceed a predetermined threshold.

* * * * *